United States Patent [19]

Shimizu

[11] Patent Number: 4,689,916
[45] Date of Patent: Sep. 1, 1987

[54] DOOR GLASS ASSEMBLY FOR AUTOMOTIVE VEHICLES

[75] Inventor: Yoshiro Shimizu, Kanagawa, Japan

[73] Assignee: Isuzu Motors Ltd., Tokyo, Japan

[21] Appl. No.: 802,959

[22] Filed: Nov. 29, 1985

Related U.S. Application Data

[63] Continuation of Ser. No. 561,369, Dec. 14, 1983, which is a continuation-in-part of Ser. No. 247,574, Mar. 26, 1981, abandoned.

[30] Foreign Application Priority Data

| Mar. 31, 1980 | [JP] | Japan | 55-42884 |
| Mar. 31, 1980 | [JP] | Japan | 55-42885 |
| Mar. 31, 1980 | [JP] | Japan | 55-42886 |
| Apr. 28, 1980 | [JP] | Japan | 55-58646 |
| Apr. 28, 1980 | [JP] | Japan | 55-58647 |

[51] Int. Cl.⁴ ............................................. E05F 11/38
[52] U.S. Cl. ..................................... 49/374; 49/166; 49/441; 49/462; 49/502
[58] Field of Search ............... 49/502, 374, 227, 348, 49/166, 440, 441, 488, 462

[56] References Cited

U.S. PATENT DOCUMENTS

| 1,670,466 | 5/1928 | Marshall | 49/374 |
| 1,911,275 | 5/1933 | Hanson | 49/166 X |
| 2,024,773 | 12/1933 | Lohrman | 49/374 |
| 2,793,405 | 5/1957 | Focht | 49/488 |
| 2,994,555 | 8/1961 | McClure | 49/166 X |
| 3,162,281 | 12/1964 | Kraska et al. | 49/374 |
| 3,547,515 | 12/1970 | Shanok et al. | 49/462 X |
| 3,808,743 | 5/1974 | Renner et al. | 49/374 X |
| 4,089,134 | 5/1978 | Koike | 49/374 X |
| 4,119,325 | 10/1978 | Oakley et al. | 49/490 X |
| 4,240,227 | 12/1980 | Hasler et al. | 49/374 X |

*Primary Examiner*—Philip C. Kannan
*Attorney, Agent, or Firm*—Sughrue, Mion, Zinn, Macpeak, and Seas

[57] ABSTRACT

A door glass assembly including guide shoes secured to end portions of a movable door glass. The guide shoes engage with door guide grooves formed along door frame members. The engaged portion of the guide shoe is located at a predetermined offset position so that the outer surface of the door frame members and the door glass are flush with each other to thereby reduce noise and air drag.

6 Claims, 16 Drawing Figures

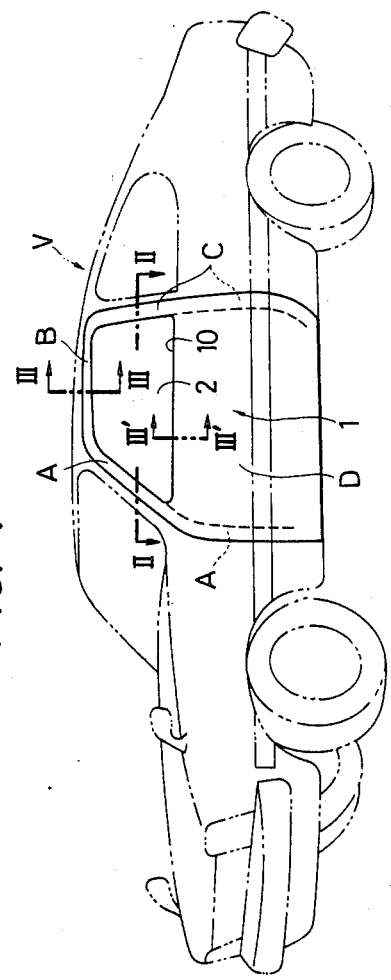
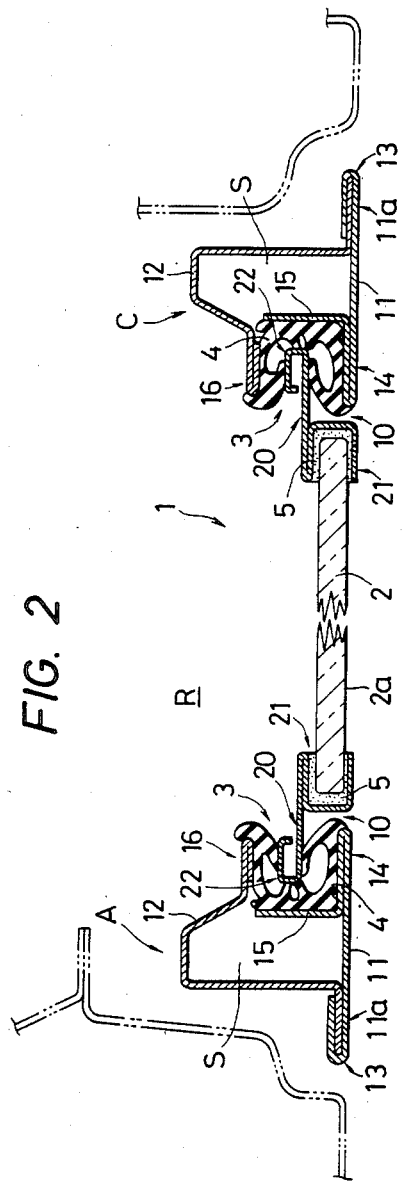
FIG. 1
FIG. 2

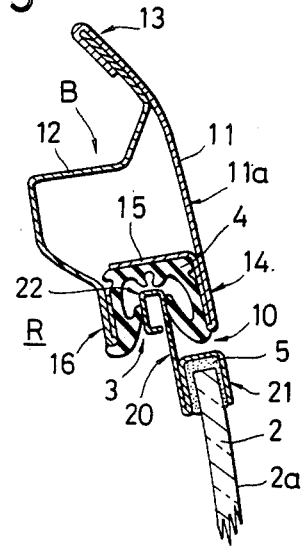
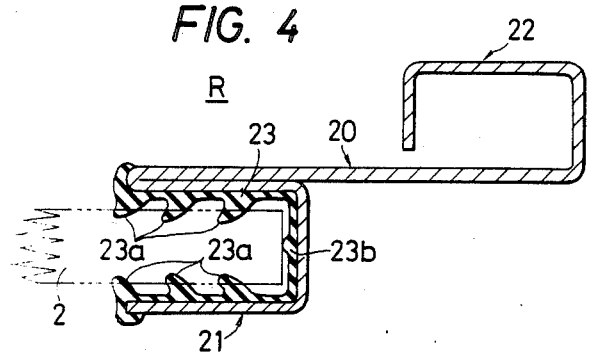
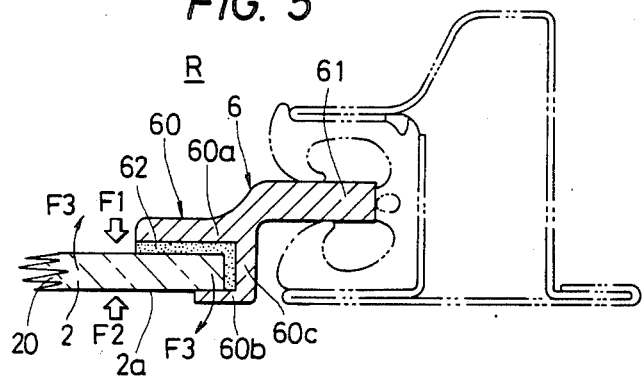

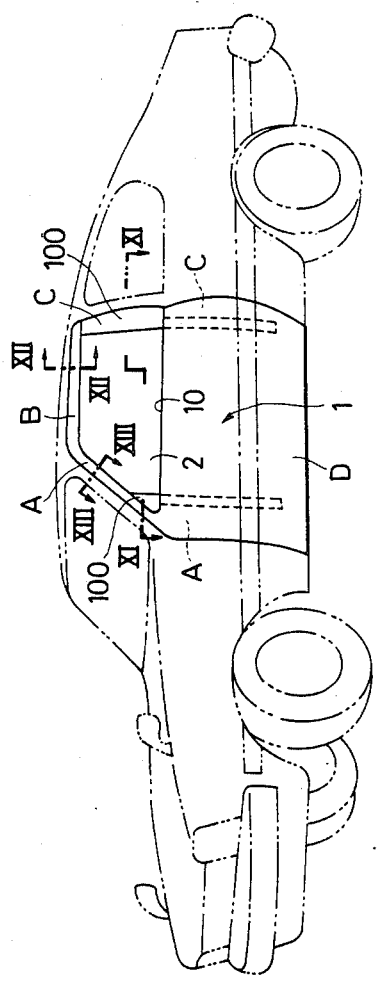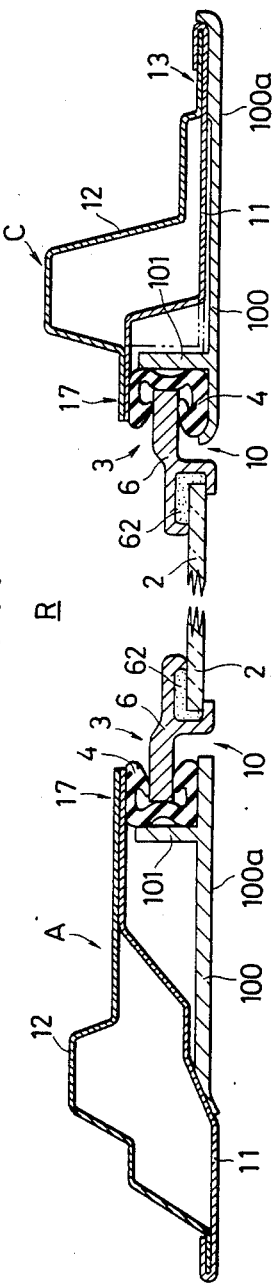

DOOR GLASS ASSEMBLY FOR AUTOMOTIVE VEHICLES

This is a continuation application of Ser. No. 561,369, filed Dec. 14, 1983 which is a continuation-in-part of application Ser. No. 247,574 filed Mar. 26, 1981, now abandoned

BACKGROUND OF THE INVENTION

The present invention relates to a door glass assembly for automotive vehicles.

There have heretofore been provided door glass assemblies in which each of front, upper and rear end portions of a door glass is inserted into a corresponding channel-shaped door glass elevating and lowering guide groove formed in front, upper and rear door frames. The door glass is made movable up and down along the guide grooves using a well-known door glass elevating and lowering mechanism.

In such prior art assemblies, the door glass guide grooves are located at an offset position from an outer surface of a door outer panel which constitutes a part of a body outer surface and which is positioned at substantially the same level of the door body outer surface. Namely, the door glass guide grooves are located at a retracted position toward the passenger compartment. Further, the door glass is inserted into the grooves at its ends. Accordingly, with such a construction, the outer surface of the door glass is in assembly retracted to the offset position from the door body outer surface at all positions adjacent a perimeter of the door glass. Thus, a recess defined by the door glass outer surface must necessarily be provided.

The above-described recess degrades the aesthetic appeal of the vehicle and the aerodynamic characteristics thereof. In particular, a vehicle using this design running at a high speed encounters a high wind resistance. This leads to a high noise level and poor fuel economy as well as making the vehicle more difficult to handle.

Accordingly, an object of the present invention is to overcome the above noted defects, specifically, to substantially eliminate the above-described recess. Even more specifically, it is an object of the invention to provide a novel door glass assembly wherein the outer surface of the door glass is substantially flush with the outer door frame at side and top positions of the door glass.

SUMMARY OF THE INVENTION

According to the present invention, door glass elevating and lowering guide grooves are formed in door frame members which define a door glass opening within a door body. The door glass opening and closing is movably supported along the guide grooves. Guide shoes are affixedly secured to end portions of the door glass. One end of each guide shoe is located at an offset position from the outer surface of the door glass toward the passenger compartment extending parallel to the door glass. With the ends of the guide shoes inserted into the guide grooves, the outer surface of the door glass is substantially flush with the outer surfaces of the frame members.

With such a construction, the door glass surface is located substantially flush with the body surface of the vehicle, except at a waist line of the opening which the door glass is used to close, to thereby form a substantially continuous surface.

The guide shoes are formed along the glass ends corresponding to the door glass guide grooves formed in the door frame members. The guide grooves may be formed along the overall door frame members or may be formed in parts of the door frame members. In the latter case, weather strips are provided within the guide grooves. In this case, no guide shoes are formed at the door glass ends corresponding thereto, and the end surface of the door glass is directly contacted against the weather strip when the door glass closes the opening. The assembly is also constructed so that the door glass outer surface is flush with the outer door surface at the side and top positions of the door glass.

According to another aspect of the invention, garnishes are attached to the outer surface of the door frame members. The garnishes serve as parts of the door glass elevating and lowering grooves.

BRIEF DESCRIPTION OF THE DRAWINGS

The present invention will be described in greater detail with reference to the accompanying drawings in which:

FIG. 1 is a perspective view of a vehicle to which the invention is applied, in which the door is depicted with solid lines;

FIG. 2 is a cross-sectional view of the structure of FIG. 1 taken along the line II—II in FIG. 1;

FIG. 3' is a cross-sectional view taken along a line III'—III' in FIG. 1;

FIG. 4 is an enlarged view of a modification of the guide shoe shown in FIG. 2;

FIG. 5 is an enlarged view of another modification of the guide shoe;

FIG. 10 is another perspective view of a vehicle according to the present invention, in which the door is indicated by solid lines;

FIG. 11 is a partial cross-sectional view taken along a line XI—XI in FIG. 10;

DESCRIPTION OF THE PREFERRED EMBODIMENTS

Figure 3:
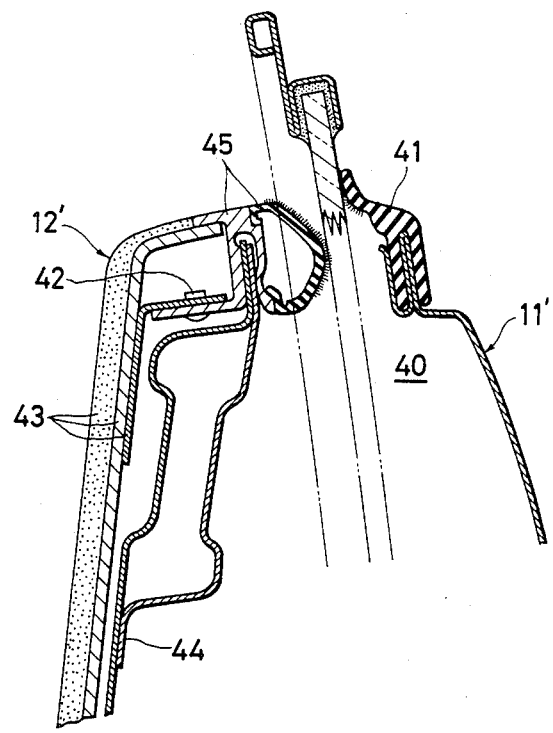
FIG. 3 is a partial cross-sectional view of the structure of FIG. 1 taken along a line III—III in FIG. 1.

Referring now to FIGS. 1 to 3, a door 1 is openably mounted on an automotive vehicle body. The door 1 is made up of front door frame meber A, upper door frame member B, rear door frame member C and door body D. A door window glass opening 10 is defined by the frame members A, B and C and the body D. A lower peripheral edge extending in a longitudinal direction of the opening 10 will hereinafter be referred to as the "waist line". Within the door 1, a door glass 2 opening and closing the opening 10 is supported so as to be movable up and down.

The above-described door frame members A, B and C are composed of a door outer panel 11 and a door inner panel 12. The door frame members will hereinafter be simply referred to as the "frames" and the door outer and inner panels will be simply referred to as "outer panel" and "inner panel", respectively. An outer surface 11a of the outer panel 11 forms a part of the outer surface of the vehicle body, both surfaces being in substantially the same plane. An L-shaped bent portion of the inner panel 12 is in abutment with an inner surface of the outer panel 11, the outer and inner panels being secured to each other by folding back the outer panel end portion thereby forming a hemming 13 at a peripheral edge thereof. The hemming 13 forms the outer peripheral edge of the door 1.

The other end portion of the outer panel 11 is bent back and folded to form a folded portion 14 and the end periphery thereof is bent to be normal to the outer panel 11 to form a flange portion 15. The folded portion 14 defines a part of the opening 10.

As described above, one end portion of the inner panel 12 is coupled to the end portion of the outer panel 11 by the hemming 13. The flange portion 15 is disposed between a hemmed portion 16 and the folded portion 14 of the outer panel 11 which are arranged substantially parallel to one another. A closed section S is formed by the outer and inner panels 11 and 12 and the flange portion 15.

A substantially U-shaped guide channel 3 is defined by the folded portion of the outer panel 11, the end portion 16 of the inner panel 12, and the flange portion 15. In the channel 3 is provided a weather strip 4 in which an elevating and lowering guide groove for the door glass 2 is provided. Thus, the door body D is made up of the outer panel 11 and the inner panel 12 and a portion corresponding to the opening 10 is provided with a weather strip having a suitable clearance through which the door glass 2 can be moved up and down (not shown). The clearance corresponds to a clearance defined between outer waist seal 41 and inner waist seal 45 as later described in conjunction with FIG. 3'. The above-described guide channels 3 are formed above the waist line in the frames and the door glass 2 is guided by the assistance of other U-shaped guide members formed in the door body D below the waist line.

As FIG. 3' illustrates, at the waist line in a section between the front and the rear frame members A and C, a door having panel 11' and the door outer base seal 41 extend outwards relative to the door glass 2 so that the door glass can slide upward and downward within a space 40 between the outer panel 11' and a door inner panel 12'. According to all embodiments, the door outer panel 11' and the base seal 41 extend outward in the vicinity of the waist line so as to allow the door glass to slide within and out of the space 40. Accordingly, though the door glass necessarily is recessed a small distance from the door outer waist seal 41, the door glass 2 is substantially flush with the outer panel 11 at all other perimeter portions of the door glass. In FIG. 3', reference numeral 42 represents a fastener, reference numeral 43 represents a door trim assembly, reference numeral 44 represents a waist reinforcement, and reference numeral 45 represents the door inner waist seal.

At the ends of the door glass 2 are provided guide shoes 20. Each guide shoe 20 is made of a plate member in the specific embodiment shown in FIGS. 2 and 3. The clamping portion 21 clamps the end portion of the door window glass 2 with a suitable clearance. The clamping portion 21 is folded as shown and extends parallel to the door glass surface. The guide shoe 20 terminates at the guide portion 21 formed by bending the plate member parallel to the door window 2. The guide shoe 20 has at the other end a closed cross section 22 the width of which is substantially equal to that of the door glass 2. In the embodiment shown in FIGS. 2 and 3, the channel-shaped clamping portion 21 is filled with a suitable adhesive 5 to secure the door glass 2 thereto.

The door window glass 2 is supported by a well-known device such as a manual window winding mechanism or a power window device mounted within the door 1 to thereby be movable up and down in and out of the space 40.

When the door glass 2 is in the closed or upward position closing the opening 10, the guide portion 22 of the guide shoe 20 is inserted into the guide channel 3 of the frames A, B and C through the weather strips 4. That is, the guide portion 22 is inserted into the door glass elevating and lowering guide grooves. The guide portion 22 is positioned at an offset position from the outer side surface 2a on the passenger compartment R side. Accordingly, when the guide portion 22 is supported by the channel 3 in the weather strip 4, the outer surface of the glass 2a is flush with the outer surface 11a of the door outer panel 11 which is at substantially the same level as the body outer surface.

Upward and downward movement of the door glass 2 can be smoothly carried out by sliding movement of the guide shoe 20 (guide portion 22) along the guide channel 3. The guide function of the guide channel 3 is carried out mainly at portions at the frame C and a portion of the frame A which are parallel to each other.

The guide shoe 20 for the door glass 2 is provided at peripheral edge portions thereof except for the lower edge portion of the door window in the embodiment shown. The guide channel 3 is only provided at necessary parts of frames A to C while the guide channel 3 extends below the waist line 10 in the door. With respect to the front and rear frames A and C, the guide channel 3 need not be excessively provided below the lower position of the door window.

FIG. 4 shows another embodiment of the door guide shoe for the door glass 2 according to the present invention. Flexible materials such as PVC (polyvinyl chloride) and rubber 23 are applied to the inner portion of the channel-shaped clamping portion 21 by melting. The end portion of the glass is then pressingly inserted into the clamping portion 21 to thereby couple the glass end to the clamping portion 21.

A plurality of corrugated lips 23a and a projection 23b abutting against the end surface of the glass 2 are formed from the flexible material 23. With these members, a strong clamping force is applied to the glass 2 to obtain good frictional coupling. According to this aspect of the present invention, the glass mounting is made somewhat easier in comparison with the adhesion coupling as shown in FIGS. 2 and 3.

FIG. 5 shows still another embodiment of the guide shoe according to the invention. The guide shoe shown in FIG. 5 is an integral molded product such as a plastic or a zinc die-cast product. The guide shoe 6 is composed of clamping portion 60 in the form of generally a U-shape and a guide portion 61 extending from a corner of the clamping portion to an offset position parallel to the outer surface 2a of the glass 2.

The above-described clamping portion 60 is provided with two extensions 60a and 60b which are parallel to each other and which clamp the end portion of the door glass. A connecting portion 60c bridges the two extensions 60a and 60b to thereby form substantially a U-shape with the connecting portion 60c confronting the end surface of the glass 2. The extension 60a on the passenger compartment R side is longer than the extension 60b on the outer side.

The guide shoe 6 is secured to the glass by adhesive 62. Since in the embodiment shown in FIG. 5 adhesive is applied to the portions corresponding to the extension 60a and the connecting portion 60c, the adhesion strength is considerably enhanced.

As described above, since the extension 60a is longer than the extension 60b, a large effective adhesive region is provided which gives a strong adhesion strength. This offers various advantages including the facts that the adhesion application is easy, the mechanical strength is enhanced, and the effective glass area is broadened. It has been determined that the shorter the extension 60a on the outer side, the more the larger effective glass area on the outer side will enhance the appearance of the outer design. After completion of the assembling of the door in which the guide shoe 6 is inserted into the channel 3, if a force F1 (FIG. 5) is applied to the window glass from the inside to the outside, the door window glass is supported by a tension force of the adhesives 62 applied to the clearance between the long extension 60a and the corresponding glass portion and by the stop effect of the short extension 60b on the outside of the glass 2.

If an opposite force F2 (FIG. 5) is applied to the door glass 2, the door glass is supported by the long extension 60a. If twisting force F3 is applied to the door glass 2, the extension 60b serves as a stop.

Figure 6:
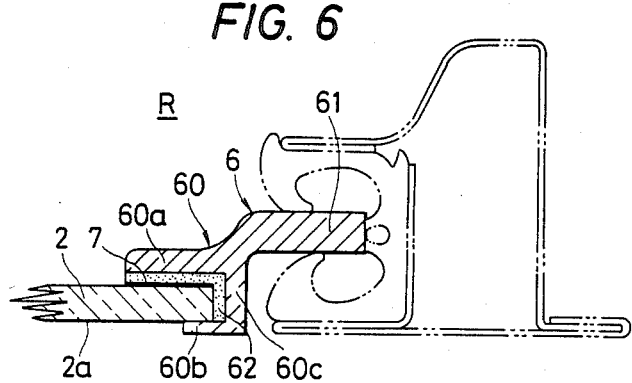
FIG. 6 is a cross-sectional view of a modification of the mounting portion between the guide shoe shown in FIG. 5 and a glass end.

FIG. 6 shows a modification of the embodiment of FIG. 5. Prints such as a ceramic print 7 are applied to an inner surface of the end portion of the door glass confronting the extension 60a of the clamping portion 60. The ceramic print 7 is dyed black and the ceramic print per se is inorganic. Therefore, the print provides superior heat resistance, water-proofing and light interruption characteristics. The performance of the adhesive is permanently protected and further the appearance is enhanced. If the length of the extension 60a is equal to that of the extension 60b, the print is unnecessary.

Figure 7:
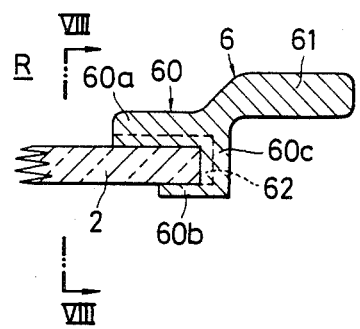
FIG. 7 is a cross-sectional view taken along a line VII—VII in FIG. 8 showing another embodiment of the guide shoe.
Figure 8:
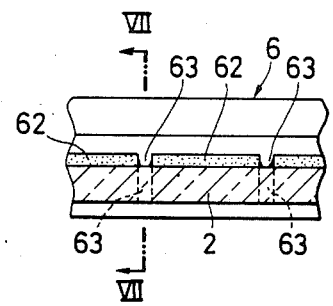
FIG. 8 is a cross-sectional view taken along a line VIII—VIII in FIG. 7.

FIGS. 7 and 8 show still another embodiment of the above-described guide shoe. A plurality of ribs 63 are integrally formed on the inner surfaces of the extension 60a and the connecting portion 60c. The ribs are formed at suitable intervals and extend in the direction of the end surface of the glass 2. The glass 2 is inserted into the L-shaped ribs and the inner surface of the short extension 60b. Adhesive 62 is filled in the spaces defined by the respective ribs and end surfaces of glass so that the guide shoe 6 is secured to the end portions of glass 2.

The above described ribs 63 of the guide shoe 6 serve to position the glass appropriately to thereby ease the assembly operation. Also, the ribs 63 function as a dam to prevent the adhesive from overflowing therefrom in the longitudinal direction to thereby ensure a desired adhesion strength. Furthermore, the ribs 63 prevent a twisting force from being applied to the adhesive to thereby prevent exfoliation thereof. The adhesive may be applied to the overall guide shoe 6 in the longitudinal direction or alternately the adhesive may be applied to necessary parts of the guide shoe 6.

Figure 9:
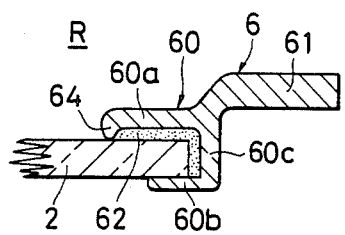
FIG. 9 is a cross-sectional view showing a modification of the guide shoe.

FIG. 9 shows a modification of the above described guide shoe. An end projection 64 extending in the longitudinal direction and confronting the inner surface of the door glass 2 is provided at the free end portion of the extension 60a on the passenger compartment R side of the clamping portion 60. The projection 64 serves to prevent the adhesive from overflowing therefrom to thus enhance the mechanical strength and appearance of the assembly. It is preferably to provide such a projection 64 on the clamping portion 60. In this case, if the above described ribs are also provided, a much more desirable effect can be obtained. However, the ribs 63 need not necessarily be provided.

FIGS. 10 and 11 show another embodiment of the present invention in which a door garnish (decorative strip or panel) 100 also serves as a groove for raising and lowering the door glass.

FIG. 11 is a partial cross-sectional view showing a part of the front door frame A and the rear door frame C on which a garnish 100 is mounted above the waist line. The reference will be made to the construction on the rear side frame C. In the same manner as described above, an outer panel 11 and an inner panel 12 form a closed section. The outer and inner panels 11 and 12 are coupled to each other with one connecting portion 17 extending parallel to the outer surface of the outer panel 11 and being positioned at an offset position from the outer surface of the outer panel 11. The coupled end 17 is in the form of a coupled flange.

The outer surface of the outer panel 11 is affixedly covered by a zinc diecast or a plastic garnish 100. The garnish 100 is provided at an end portion thereof with a wall 101 extending normal to the outer surface of the garnish and toward the above described flange 17 of the panel so that a guide channel 3 is formed by the coupled frame flange 17 and an L-shaped corner defined by the wall 101. In the same manner as described above, a weather strip 4 is inserted into the channel 3 and fixed thereto to thereby form the door glass elevating and lowering groove. Another guide groove is formed by use of the garnish 100 adjacent to the lowermost end of the opening 10 of the front frame A in the same manner shown in FIG. 11 on the right side.

At the corresponding parts of the door glass 2 are provided the guide shoe 6, for example, as shown in FIG. 9. Another U-shaped channel is formed below the garnish 100 of the frames A and C in the interior of the door body.

In this embodiment, the portions of the frame A above the garnish 100 and the frame B will be described with reference to FIGS. 12 and 13. It is to be noted that in this embodiment no guide shoe is provided at the corresponding parts of the door glass end.

When the respective guide grooves are filled with the shoes for the glass 2 and the opening portion 10 is fully opened, the outer surface 2a of the door glass 2 is positioned substantially flush with the outer surface of the respective door frame including the outer surface 100a of the garnish 100 except, of course, in the area of the waist line where the outer surface 2a necessarily is recessed from the door outer panel.

As described above, because of aesthetic design requirements, a garnish is often desirable. When in fact a garnish is used, in accordance with the invention parts of the garnish serve also as door glass elevating and lowering guides. Accordingly, the glass surface and the body outer surface are flush with one another. In comparison with the formation of guide grooves in the door frame, the above-described construction is simple thereby easing the molding and assembly operations.

The garnish which also serves as part of the guide groove can be used partly at the frames A and C as shown in FIG. 10. The garnish can be used at either frame A or C or alternately can be used at all of the frames A, B and C positioned above the waist line. The position of the guides is not limited to specific parts. The garnish may be made of plastics or it may be made as a zinc diecast member.

It is desirable that in the door glass assembly, the garnish may be mounted on any one of the frames A to C and serve as the guide shoe groove and for the guide shoe to be inserted into the garnish so that the body outer surface and the outer surface of the door glass are substantially flush.

Figure 12:
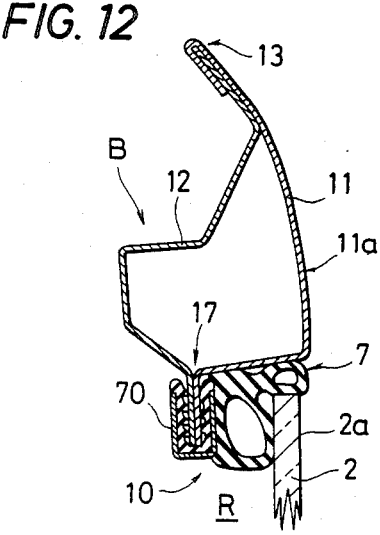
FIG. 12 is a cross-sectional view taken along a line XII—XII in FIG. 11, corresponding to FIG. 3.
Figure 13:
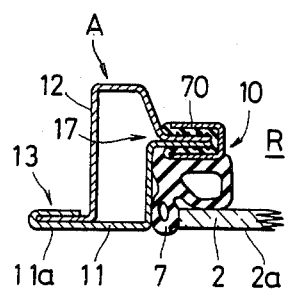
FIG. 13 is a cross-sectional view taken along a line XIII—XIII in FIG. 11, corresponding to FIG. 2.

If the invention as shown in FIG. 11 is applied to one part of the frames A to C, the other parts of the frames are so constructed that only the weather strip 7 is provided on the corresponding parts as shown in FIGS. 12 and 13 and that weather strips are only provided on the corresponding parts of the glass end portions. Such embodiments will be described In FIGS. 12 and 13, the ends 13 of the outer and inner panels 12 and 11 are coupled by hemming in the same manner as described above and the other ends 17 are coupled at the offset position to the outer panel on the passenger compartment side and welded to thereby form a closed section at intermediate portions as shown.

The inner end of the coupled flange of the panels constitutes a part of the opening 10 of the door 1. An L-shaped end surface is provided between the coupled flange 17 and the outer panel 11. To the coupled flange 17 a weather strip is affixedly secured by mounting clips 70 (finishers). The weather strip 7 is disposed below the L-shaped end surface.

Since the door glass 2 is inserted into the channel portion as indicated by the dotted lines in FIG. 10 below the waist line of the frames C and A and retained thereat, when the glass is raised and the opening 10 is closed, as shown in FIGS. 12 and 13 the outer surface 2a of the glass is substantially flush with the outer surface 11a of the outer panel except at the waist line. The clearance between the above-described L-shaped end surface of the outer panel 11 and the end surface of the glass 2 is sealed by the weather strip 7. In an embodiment constructed by a combination of the structure of FIG. 11 and FIG. 12 or 13, the door glass 2 is substantially flush with the body outer surface.

Figure 14:
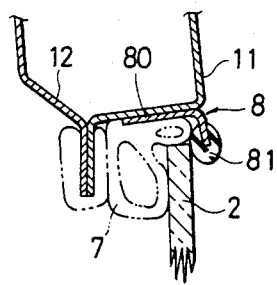
FIG. 14 is a modification of FIG. 12.
Figure 15:
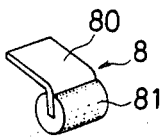
FIG. 15 is a perspective view of a clip used with the invention.

In the embodiment shown in FIGS. 12 and 13, if the guide clips 8 as best shown in FIG. 15 are affixedly provided on the lower end surface of the outer panel 11 (the marginal portion of the frames A, B or C) as shown in FIG. 14, the glass 2 is readily moved up and down guided by the guide clips 8. The glass is also prevented from being displaced to thus enhance the sealing of the window. The guide clip 8 is composed of a bent body 80 and a guide portion 81 into which the bent portion of the body 80 is inserted. The guide clips 8 are mounted so that the guide portion 81 is located close to the locus of movement of the outer surface of the glass.

As mentioned above, advantageous features of this embodiment are that the garnish serving as a guide is provided at least one portion of the frames A, B or C above the waist line, a simple flange construction with the weather strip is formed at the other part of the frames as shown in FIGS. 12 and 13, offset guide except for the flange construction, and the guide shoes are inserted into the guide grooves whereby the body outer surface and the glass outer surface are substantially flush.

With the above-described construction, the outer contour of the glass appears quite large. Therefore, the overall glass and window also appear large. Furthermore the construction is simple and requires only a small number of parts. This leads to both a weight and cost reduction. This construction can be combined with a garnish structure to thereby enhance the design of the door construction.

According to the invention, with a relatively simple construction, the outer surfaces of the door glass and the body are made substantially flush with one another thereby enhancing the appearance of an automotive vehicle utilizing the invention. The invention also provides a significant reduction in noise and improved fuel economy.

What is claimed is:

1. A door glass assembly for an automobile door comprising:
   a door body member;
   top and side frame members defining an opening within said door body member;
   a door glass for opening and closing said opening;
   door glass elevating and lowering guide groove means fixed to said frame members for supporting and permitting movement of said door glass;
   weather strip means for slidably guiding said door glass, said weather strip means being mounted in said door glass elevating and lowering groove means;
   guide shoe means fixedly secured to at least one end portion of said door glass, said guide shoe means slidably engaging said guide groove means, said guide shoe means including at least one guide shoe member having at one end a guide portion substantially parallel to said door glass and slidably engaging said weather strip means, said guide portion being located at a predetermined offset portion with respect to a central plane of said door glass to fair said door glass with a door outer panel, a first extension on a passenger compartment side, a second extension on the outside and a connecting portion therebetween defining a U-shaped channel for clamping an end portion of said door glass, an adhesive applied to portions corresponding to said first extension and said connecting portion of said guide shoe member, said second extension being shorter and thinner than said first extension;
   said guide shoe member is made of plastic by integrally molding; and
   said end portion of said door glass is pressingly inserted into said clamping portion whereby said door glass is fixedly secured to said clamping portion, and the surface of said door glass and said door body member are made substantially flush.

2. The assembly of claim 1 wherein a longitudinal projection is formed at the end of said first extension for enclosing a wide clearance, said clearance being filled with adhesive.

3. The assembly of claim 1 wherein a plurality of ribs are formed on an inside surface of said first extension and on an inside surface of said connecting portion at predetermined intervals in a longitudinal direction of said guide shoe member, an end surface of said door glass defining a plurality of wide clearances, and said clearances being filled with adhesive whereby said end portion of said door glass is fixedly secured to said clamping portion.

4. The assembly of claim 3 wherein a longitudinal projection is formed at the end of said first extension for enclosing a wide clearance, said clearance being filled with adhesive.

5. The assembly of claim 1 further comprising at least one garnish, wherein said door frame members comprise an outer panel and an inner panel, each of said door frame members having a hollow closed section therein and at an end a flange coupled portion, said flange coupled portion being located at a second offset position from an outer surface of said outer panel extending parallel to said outer surface of said outer panel, said garnish being secured to said outer surface of the door outer panel so that a side end portion of said garnish extends parallel to said flange coupled portion and covers the outside surface of said weather strip means, whereby said door glass elevating and lowering guide means is defined by said side end of said garnish and said flange coupled portion.

6. The assembly of claim 5 further comprising a plurality of garnishes, a first garnish being provided at a lower portion of the door frame located on a front side of said door opening and a second garnish being provided on the door frame located on a rear side of said door opening, remaining portions of said door frames being provided with said weather strip means, and a door glass end portion corresponding to said remaining portions of said door frames being directly abuttable against said weather strip means.

* * * * *